(12) United States Patent
Doria

(10) Patent No.: US 11,668,617 B2
(45) Date of Patent: Jun. 6, 2023

(54) HYDRAULIC DIAPHRAGM SEAL AND PRESSURE TRANSDUCER HAVING A HYDRAULIC DIAPHRAGM SEAL

(71) Applicant: Endress+Hauser SE+Co. KG, Maulburg (DE)

(72) Inventor: Patrick Doria, Berlin (DE)

(73) Assignee: Endress+Hauser SE+Co. KG, Maulburg (DE)

(*) Notice: Subject to any disclaimer, the term of this patent is extended or adjusted under 35 U.S.C. 154(b) by 308 days.

(21) Appl. No.: 17/279,042

(22) PCT Filed: Aug. 15, 2019

(86) PCT No.: PCT/EP2019/071897
§ 371 (c)(1),
(2) Date: Mar. 23, 2021

(87) PCT Pub. No.: WO2020/064213
PCT Pub. Date: Apr. 2, 2020

(65) Prior Publication Data
US 2022/0003624 A1    Jan. 6, 2022

(30) Foreign Application Priority Data
Sep. 24, 2018   (DE) ..................... 10 2018 123 433.3

(51) Int. Cl.
*G01L 19/00* (2006.01)
*F16J 3/02* (2006.01)
(Continued)

(52) U.S. Cl.
CPC ............ *G01L 19/0092* (2013.01); *F16J 3/02* (2013.01); *G01L 19/04* (2013.01); *G01L 19/0645* (2013.01); *F16J 15/0887* (2013.01)

(58) Field of Classification Search
None
See application file for complete search history.

(56) References Cited

U.S. PATENT DOCUMENTS

| | | | | |
|---|---|---|---|---|
| 6,561,037 B2* | 5/2003 | Bohler | ............... | G01L 19/0618 73/706 |
| 7,866,214 B2* | 1/2011 | Banholzer | ........... | G01L 19/0092 73/714 |
| 8,122,771 B2* | 2/2012 | Seeberg | .............. | G01L 19/0023 73/756 |

FOREIGN PATENT DOCUMENTS

| | | |
|---|---|---|
| AT | A95095 A | 5/1996 |
| CN | 101377423 A | 3/2009 |

(Continued)

*Primary Examiner* — Octavia Davis Hollington
*Assistant Examiner* — Jermaine L Jenkins
(74) *Attorney, Agent, or Firm* — Christopher R. Powers; Endress+Hauser (USA) Holding, Inc.

(57) ABSTRACT

A diaphragm seal for transmitting the pressure of a process medium includes a main body having a surface and a separating membrane secured to the surface, thereby forming between the separating membrane and the surface a pressure chamber which communicates, via an opening in the surface, with a hydraulic path. The separating membrane can be exposed to the process medium on a first side, and the separating membrane has a central middle region. The diaphragm seal further includes a temperature transducer for determining a temperature measurement variable of the process medium, which is secured in the middle region on a second side of the separating membrane, and the main body is joined to the separating membrane such that a transmitting fluid, which fills the pressure chamber and the hydraulic path, does not come into contact with the temperature transducer.

12 Claims, 1 Drawing Sheet

(51) Int. Cl.
    *G01L 19/04*     (2006.01)
    *G01L 19/06*     (2006.01)
    *F16J 15/08*     (2006.01)

(56) References Cited

FOREIGN PATENT DOCUMENTS

| | | | |
|---|---|---|---|
| CN | 105928647 A | 9/2016 | |
| CN | 106574877 A | 4/2017 | |
| CN | 107771274 A | 3/2018 | |
| CN | 108369148 A | 8/2018 | |
| DE | 10319417 A1 | 11/2004 | |
| DE | 102005035931 A1 | 2/2007 | |
| DE | 102005056762 A1 | 5/2007 | |
| DE | 102012204950 A1 | 10/2013 | |
| DE | 102019209353 A1 * | 12/2020 | ........... G01L 9/0016 |
| EP | 2333508 A1 | 6/2011 | |

* cited by examiner

HYDRAULIC DIAPHRAGM SEAL AND PRESSURE TRANSDUCER HAVING A HYDRAULIC DIAPHRAGM SEAL

CROSS-REFERENCE TO RELATED APPLICATIONS

The present application is related to and claims the priority benefit of German Patent Application No. 10 2018 123 433.3, filed on Sep. 24, 2018, and International Patent Application No. PCT/EP2019/071897, filed on Aug. 15, 2019, the entire contents of which are incorporated herein by reference.

TECHNICAL FIELD

The present invention relates to a hydraulic diaphragm seal and a pressure transducer having a hydraulic diaphragm seal.

BACKGROUND

Hydraulic diaphragm seals conventionally include a main body which has a surface to which a separating membrane with at least two weld seams is secured in a pressure-tight manner so that a pressure chamber is formed between the separating membrane and the surface and communicates with a hydraulic path via an opening in the surface of the main body. The pressure chamber and the hydraulic path are filled with a transmitting fluid.

Knowledge of the process temperature is generally essential for controlling an industrial process. When hydraulic diaphragm seals are used, the process temperature is usually detected by two different possibilities. With the first possibility, a resistance change of a resistor in the pressure transducer is used to determine the process temperature, whereas with the second possibility, a temperature transducer formed separately from the pressure transducer is used to determine the process temperature.

However, both possibilities have the disadvantage that real-time temperature detection is not possible because of the inertia of the transmitting fluid.

Insofar as temperature-dependent deformations of the separating membranes are accompanied by a separating membrane error during the pressure measurement, it is likewise of fundamental interest for precise pressure measurements to know the temperature of the diaphragm seal in the region of the pressure chamber or of the separating membrane and thus of the process as precisely as possible. The solutions known from the prior art have a temperature transducer which is arranged either next to the separating membrane or is introduced from the rear into the main body of the diaphragm seal in order to measure the temperature of the main body in the vicinity of the pressure chamber. These sensor positions are in principle erroneous because the thermal mass of the main body prevents an immediate adaptation of the main body temperature to the temperature of the transmitting fluid in the pressure chamber, which can change very quickly with rapid changes in the medium temperature and convective heat transport through a flowing medium. In contrast, a temperature transducer which is arranged next to the separating membrane and which optionally is in contact with the medium requires either an additional opening in the media container or in the media-carrying line, through which the temperature transducer can be inserted, or with a given separating membrane area, the radius of the main body must be enlarged by such a value that space is still present on the rim of the main body for mounting a temperature transducer next to the separating membrane.

If in other measuring tasks, a second measurement variable should be detected with a second sensor in addition to the process pressure, the same design problem arises. This means that space for mounting the second sensor must again be provided.

It is therefore an object of the present invention to provide a diaphragm seal and a pressure transducer with a diaphragm seal which overcomes said disadvantages of the prior art.

SUMMARY

The object is achieved according to the invention by the diaphragm seal according to independent claim 1 and the pressure transducer according to independent claim 9.

The diaphragm seal according to the invention for transmitting a pressure of a process medium comprises:
a main body having a surface; and
a separating membrane which is secured to the surface, there being formed between the separating membrane and the surface a pressure chamber which communicates, via an opening in the surface, with a hydraulic path. The separating membrane can be exposed to the process medium on a first separating membrane side, and the pressure chamber and the hydraulic path are filled with a transmitting fluid in order to transmit the pressure of the process medium. The separating membrane is a planar membrane with a peripheral rim, the planar membrane is joined in a pressure-tight manner to the surface of the main body by a single peripheral weld seam, and the separating membrane has a central middle region, wherein the diaphragm seal furthermore comprises a temperature transducer, for determining a temperature measurement variable of the process medium, which is secured in the middle region on a second separating membrane side of the separating membrane opposite the first separating membrane side. The main body is joined in the middle region to the separating membrane in such a manner that the transmitting fluid does not come into contact with the temperature transducer.

An advantageous embodiment of the diaphragm seal according to the invention provides that the temperature transducer is joined in the middle region on the second separating membrane side to the separating membrane by means of a thermally conductive layer. The thermally conductive layer can be formed, for example, by a thermally conductive adhesive, a soft solder connection or a thermally conductive paste. The thermally conductive adhesive preferably has a thermal conductivity in the hardened state of more than 0.1, preferably more than 0.5 W/(m·K). The thermally conductive paste preferably has a thermal conductivity in the range of 0.8 to 10 W/(m·K). A soft solder layer preferably has a thermal conductivity of more than 50 W/mK.

A further advantageous embodiment of the diaphragm seal according to the invention provides that the main body has a continuous central recess, in particular a bore, into which the temperature transducer is inserted from the rear side of the main body facing away from the medium. In particular, the embodiment can provide that a gap between the temperature transducer and a wall of the central bore is at least partially clad with a thermal insulation material, preferably a thermal insulation material other than air.

A further advantageous embodiment of the diaphragm seal according to the invention provides that the main body is joined in the middle region to the separating membrane by a peripheral adhesive connection so that the transmitting fluid does not come into contact with the temperature transducer. An epoxy adhesive which has a smaller or approximately the same coefficient of thermal expansion as the surrounding main body and/or a small interaction with the transmitting fluid is preferably used as an adhesive for the adhesive connection.

A further advantageous embodiment of the diaphragm seal according to the invention provides that the main body and the separating membrane (3) each have a metallic material.

A further advantageous embodiment of the diaphragm seal according to the invention provides that the separating membrane has a deflectable working region between a peripheral line delimiting the middle region and the peripheral rim, and at least one peripheral bead is provided between the peripheral line and the peripheral rim.

A further advantageous embodiment of the diaphragm seal according to the invention provides that the peripheral adhesive connection is applied between the peripheral line delimiting the middle region and the central recess, in particular the bore.

The pressure transducer according to the invention comprises a diaphragm seal according to the invention and a pressure measurement cell which can be subjected to the pressure of the process medium via the hydraulic path of the diaphragm seal, and an electronic circuit for generating a conditioned pressure-dependent signal from a primary signal of the pressure measurement cell.

In an advantageous embodiment of the pressure transducer, it is provided that the electronic circuit comprises means for processing the signals of the temperature transducer for the temperature measurement variable. In particular, the embodiment can provide that a signal of the temperature transducer is present at the input of a correction circuit for correcting a temperature error of the pressure-dependent signal.

A further advantageous embodiment of the pressure transducer according to the invention provides that the pressure transducer is an absolute pressure transducer, a relative pressure transducer or a differential pressure transducer.

BRIEF DESCRIPTION OF THE DRAWINGS

The invention is explained in more detail based upon the following drawings. The following is shown.

DETAILED DESCRIPTION

Figure 1:
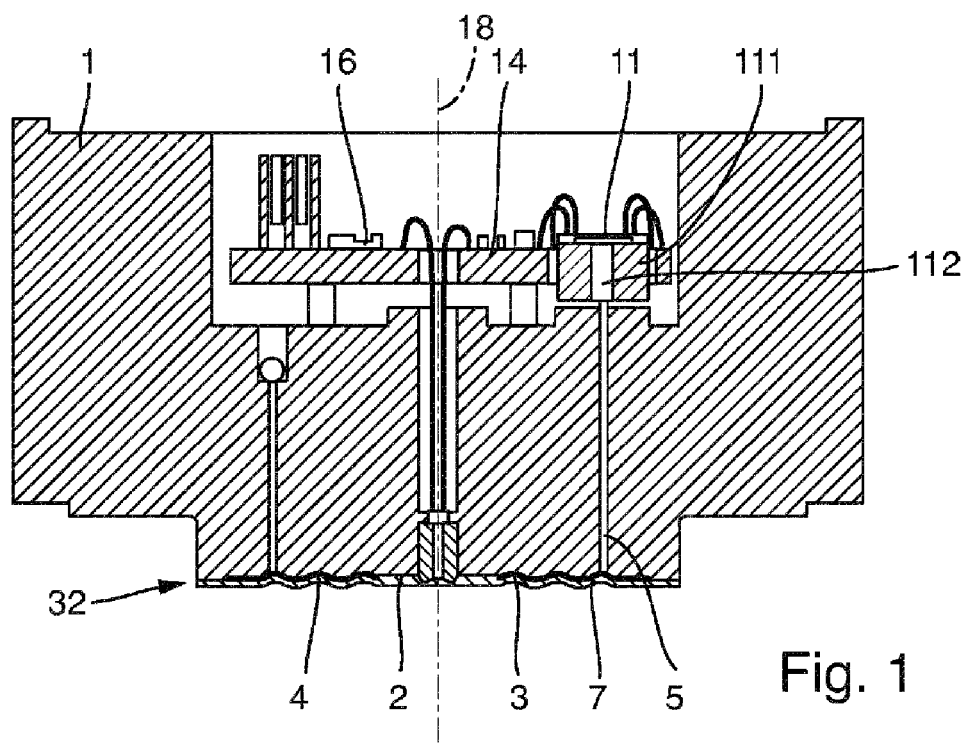
FIG. 1 shows a longitudinal section through the pressure transducer according to the present disclosure.
Figure 2:
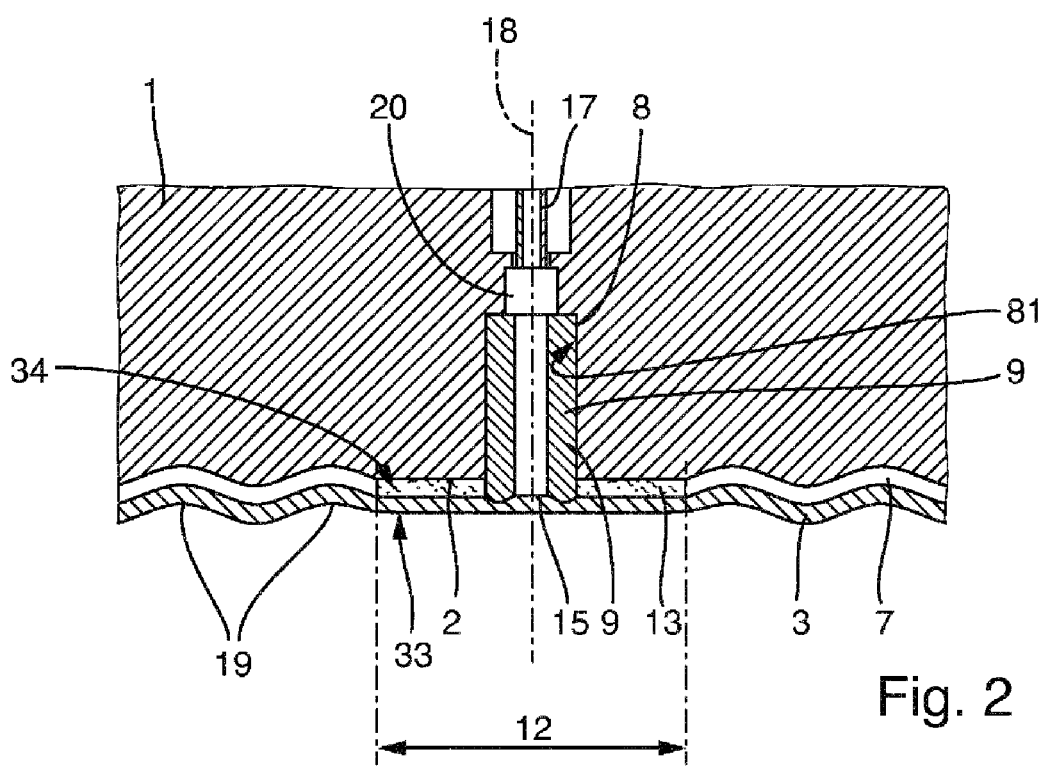
FIG. 2 shows a section of a longitudinal section through the diaphragm seal according to the present disclosure, which is part of the pressure transducer.

The pressure transducer shown in FIG. 1 comprises a main body 1 with a surface 2 to which a disk-shaped separating membrane 3 is secured with a single peripheral weld seam on its peripheral outer rim 32, whereby a pressure chamber 4 is formed between the main body and the separating membrane 3. The separating membrane 3 of this exemplary embodiment has two peripheral beads 19. From the pressure chamber 4, a bore extends through the main body 1 to form a hydraulic path 5 and transmit the pressure to a pressure receiver. In order that the pressure can also be correspondingly transmitted, the pressure chamber is filled with a transmitting fluid 7, e.g., an oil.

In other words, the components described so far relate to a diaphragm seal module which is combined with a pressure measurement cell in order to form the pressure transducer according to the invention. The pressure measurement cell comprises a carrier body 111 to which a piezo-resistive pressure-measuring element 11 is secured. The pressure measurement cell can be designed as a relative pressure measurement cell, differential pressure measurement cell or an absolute pressure measurement cell. In the embodiment shown in FIG. 1, the pressure measurement cell is designed as a relative pressure measurement cell. In this case, the pressure to be measured is applied to the pressure measurement cell via a channel 112 integrated in the carrier body 111 and joined to the bore by the main body. To this extent, the pressure measurement cell 11 serves as a pressure receiver of the hydraulic path 5 realized by the bore and the channel 112.

The primary signal of the pressure measurement cell 11 is first preprocessed by a circuit on a circuit board 14 before it is further conditioned and conditioned for communication via the common protocols, for example 4-20 mA or digital fieldbus protocols.

The pressure transducer according to the invention furthermore comprises a temperature transducer 20 which is introduced in a central bore 8 through the main body 1 of the diaphragm seal module as far as the rear side, i.e., the side of the separating membrane 3 facing away from the process, in order to detect the temperature of the process medium. A central bore in this case means a bore which extends along an axis of rotation which is related to an external contour of the main body. Since the temperature transducer 20 is not in direct contact with the process medium, contamination of the medium by the temperature transducer 20, the corrosion of the temperature transducer, and an interaction between the medium and the temperature transducer 20 can be ruled out so that such a design is particularly suitable for hygienic applications and/or for aggressive chemicals. In order to be able to reliably determine rapid temperature changes of the process medium, the temperature transducer is glued to the rear side of the separating membrane 3 with a thermally conductive adhesive 15 so that good thermal coupling is provided. The separating membrane 3 preferably has a very small thickness in the range of approximately 20-60 μm so that approximately real-time fluctuations of the temperature of the process medium can be detected by the temperature transducer 20. In order to thermally decouple the temperature transducer 20 from the transmitting fluid, the separating membrane 3 is joined to the main body 1 in a middle region 12 which extends around the axis of rotation 18. This can be done, for example, by a peripheral adhesive layer or adhesive connection 13 by means of a special adhesive which has a lower thermal conductivity than the thermally conductive adhesive. Furthermore, in order to also thermally decouple the temperature transducer 20 from the main body, a thermal insulation material 9 may be introduced into a gap between a bore wall 81 and the temperature transducer 20.

The primary signal of the temperature transducer, for example a PT1.000 sensor, is supplied via electrical lines 17 to the circuit board 14 in order to be conditioned as a measurement signal and to be optionally used for compensating the primary signal of the pressure sensor.

The invention claimed is:

1. A diaphragm seal for transmitting a pressure of a process medium, the diaphragm seal comprising:
a main body having a surface;

a separating membrane secured to the surface of the main body, thereby defining a pressure chamber between the separating membrane and the surface, wherein:
the pressure chamber communicates via an opening in the surface with a hydraulic path;
the separating membrane is configured to be exposed to the process medium on a first side;
the pressure chamber and the hydraulic path are filled with a transmitting fluid as to transmit the pressure of the process medium;
the separating membrane is a planar membrane having a peripheral rim and is joined in a pressure-tight manner to the surface of the main body by a peripheral weld seam; and
the separating membrane includes a central middle region; and
a temperature transducer adapted to determine a temperature measurement variable of the process medium, wherein the temperature transducer is secured in the middle region on a second side of the separating membrane opposite the first side, and
wherein the main body is joined to the separating membrane in the middle region such that the transmitting fluid does not contact the temperature transducer.

2. The diaphragm seal of claim 1, wherein the temperature transducer is joined to the second side of the separating membrane in the middle region via a thermally conductive adhesive layer, a soft solder connection layer or a thermally conductive paste layer.

3. The diaphragm seal of claim 2, wherein the main body is joined in the middle region to the separating membrane by a peripheral adhesive connection such that the transmitting fluid does not contact the temperature transducer.

4. The diaphragm seal of claim 1, wherein the main body includes a continuous central recess in which the temperature transducer is disposed from a rear side of the main body opposite the medium.

5. The diaphragm seal of claim 4, wherein a gap between the temperature transducer and a wall of the central recess is at least partially clad with a thermal insulation material.

6. The diaphragm seal of claim 1, wherein the main body and the separating membrane each comprise a metallic material.

7. The diaphragm seal of claim 1, wherein the separating membrane has a deflectable working region between a peripheral line delimiting the middle region and the peripheral rim, and wherein the separating membrane includes at least one peripheral bead between the peripheral line and the peripheral rim.

8. The diaphragm seal of claim 7, wherein the main body is joined in the middle region to the separating membrane by a peripheral adhesive connection, wherein the peripheral adhesive connection is applied between the peripheral line delimiting the middle region and a central recess in the main body in which the temperature transducer is disposed from a rear side of the main body opposite the medium.

9. A pressure transducer comprising:
a diaphragm seal according to claim 1;
a pressure measurement cell configured to be exposed to the pressure of the process medium via the hydraulic path of the diaphragm seal; and
an electronic circuit configured to generate a conditioned, pressure-dependent signal from a primary signal of the pressure measurement cell.

10. The pressure transducer of claim 9, wherein the electronic circuit is configured to process signals of the temperature transducer, which signals represent the temperature measurement variable.

11. The pressure transducer of claim 10, wherein the electronic circuit includes a correction circuit configured to enable correcting a temperature error of the pressure-dependent signal, wherein a signal of the temperature transducer is applied to the input of the correction circuit.

12. The pressure transducer of claim 9, wherein the pressure transducer is an absolute pressure transducer, a relative pressure transducer or a differential pressure transducer.

* * * * *